United States Patent [19]

Zukerman et al.

[11] Patent Number: 5,137,745
[45] Date of Patent: Aug. 11, 1992

[54] PROCESS FOR PREPARING SHAPED GRAIN PRODUCTS

[75] Inventors: Harold W. Zukerman; Rachael B. Zukerman, both of Northbrook, Ill.

[73] Assignee: The Quaker Oats Company, Chicago, Ill.

[21] Appl. No.: 557,878

[22] Filed: Jul. 25, 1990

Related U.S. Application Data

[63] Continuation-in-part of Ser. No. 179,658, Apr. 11, 1988.

[51] Int. Cl.$^5$ .................. A23L 1/10; A23L 1/182; A23P 1/10
[52] U.S. Cl. .................. 426/618; 426/438; 426/512; 426/524; 426/557
[58] Field of Search .............. 426/557, 618, 438, 512, 426/524

[56] References Cited

U.S. PATENT DOCUMENTS

| | | | |
|---|---|---|---|
| 3,484,251 | 12/1969 | Lawrence et al. | 99/85 |
| 3,711,295 | 1/1973 | Zukerman | 426/438 |
| 3,961,087 | 6/1976 | Zukerman et al. | 426/262 |
| 4,229,488 | 10/1980 | Suggs et al. | 426/557 |
| 4,308,295 | 12/1981 | Kuntz et al. | 426/618 |
| 4,693,900 | 9/1987 | Molinari | 426/128 |
| 4,764,390 | 8/1988 | Zukerman et al. | 426/438 |

OTHER PUBLICATIONS

Laurel Robertson, Carol Flinders, and Bronwen Godfrey, Laurel's Kitchen, 1976 Bantam Books, pp. 282-284.
Woman's Day Encyclopedia of Cookery; vol. 4; *Fawcett Publications, Inc., N.Y.*; pp. 517-518 (1966).
Everybody's Cookbook; I. Lord; *Harcourt, Brace & Company, N.Y.*; pp. 330-339 (1937).

*Primary Examiner*—Jeanette Hunter
*Assistant Examiner*—Mary S. Mims
*Attorney, Agent, or Firm*—Mart C. Matthews; Lars S. Johnson

[57] ABSTRACT

The present invention relates to a process for making a shaped cereal grain product that has a surface crust and an appearance of fully cooked but intact grains and/or pieces of grains joined together. In the process of the present invention a plurality of cereal grains having different cooking times under the same cooking conditions are selected or modified so that each cereal grain has a predetermined cooking time under the cooking conditions used in the process. These grains are cooked in hot water and/or steam until they are fully cooked and have developed sticky surfaces as a result of re-absorbing the cereal starches and/or gums leached out into the cooking water. The grains are added to the cooking water and/or steam in a sequence and at times dictated by their respective cooking times so that they all become fully cooked at approximately the same time. The grains are then cooled to a temperature lower than about 180° F. in a manner such that the grain surfaces remain sticky. After cooling the grains are formed into a shaped unit while retaining the identity of individual cereal grains and/or pieces of grains. After forming, the surface of the shaped unit is heated until a thin skin-like crust develops on its surface. This crust helps retain the unit's shape.

23 Claims, 4 Drawing Sheets

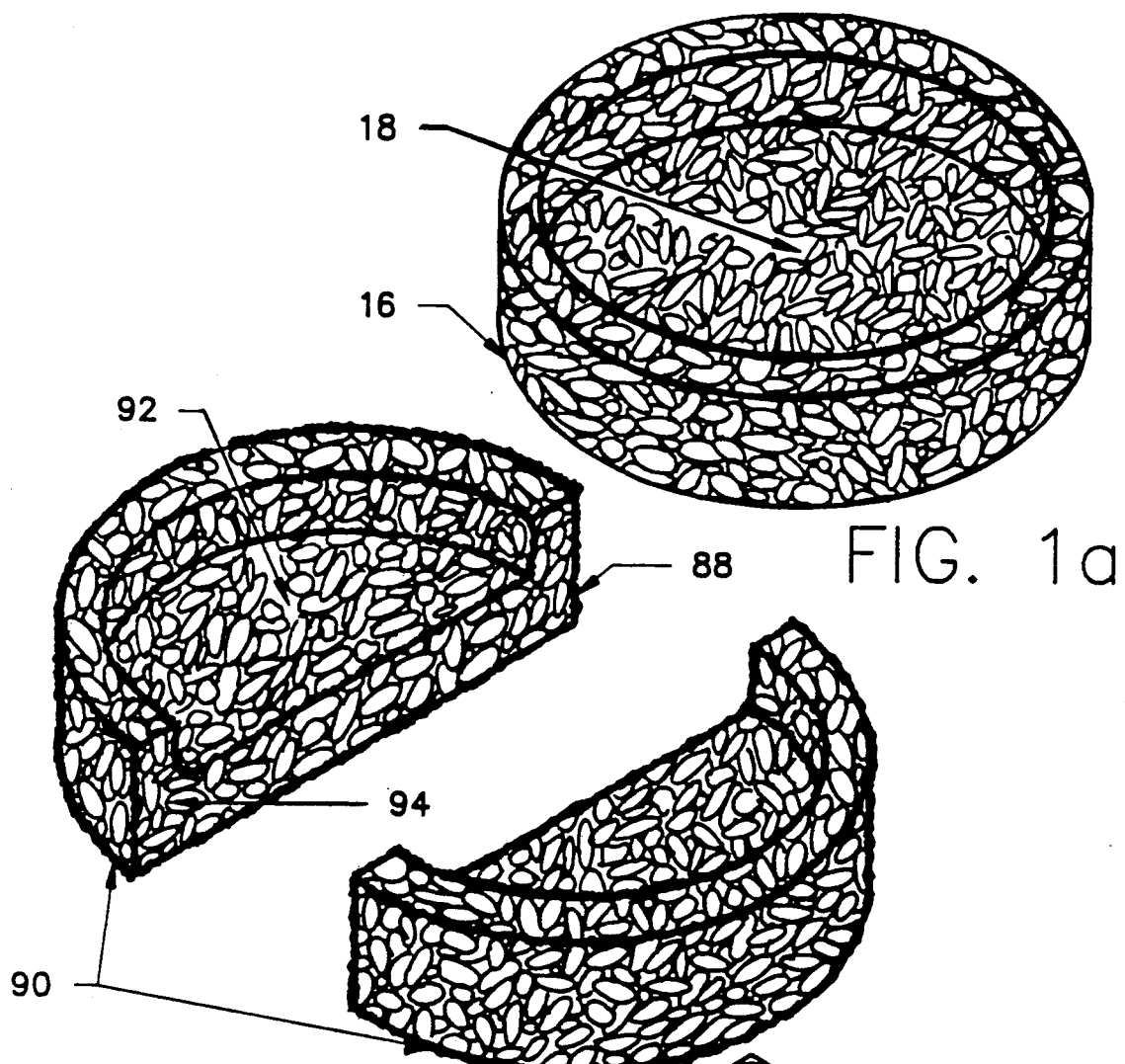
FIG. 1a
FIG. 1b
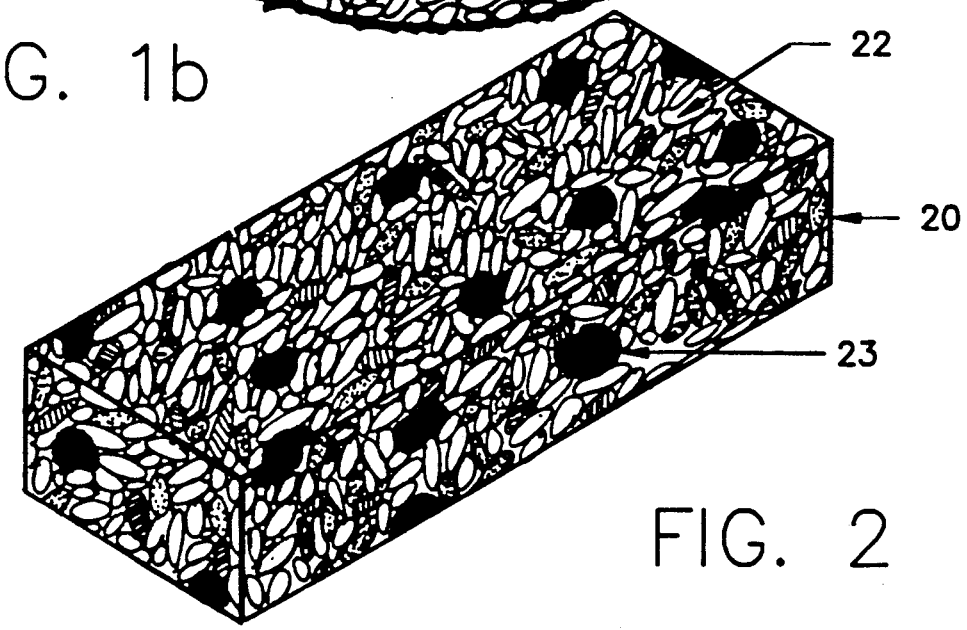
FIG. 2

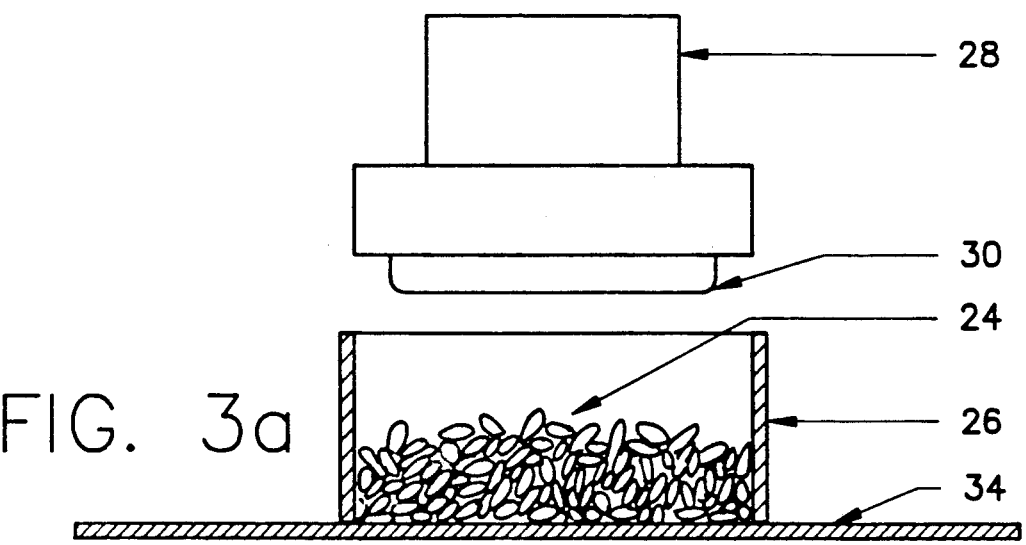
FIG. 3a
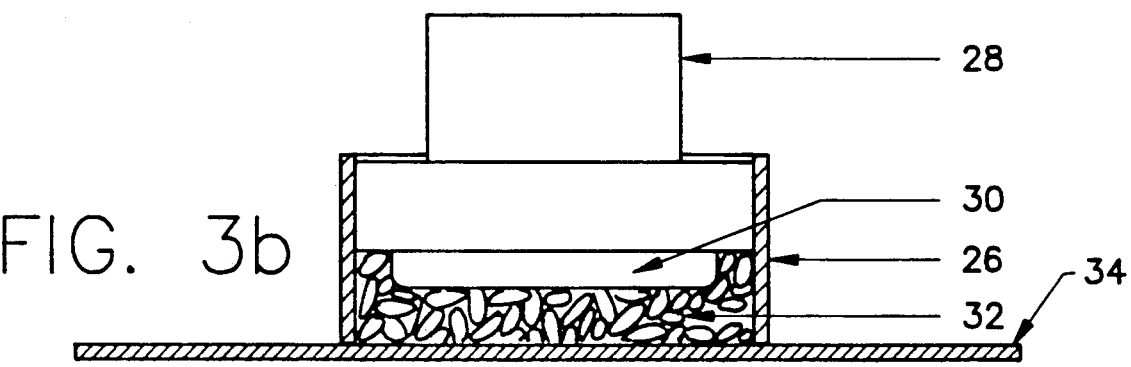
FIG. 3b
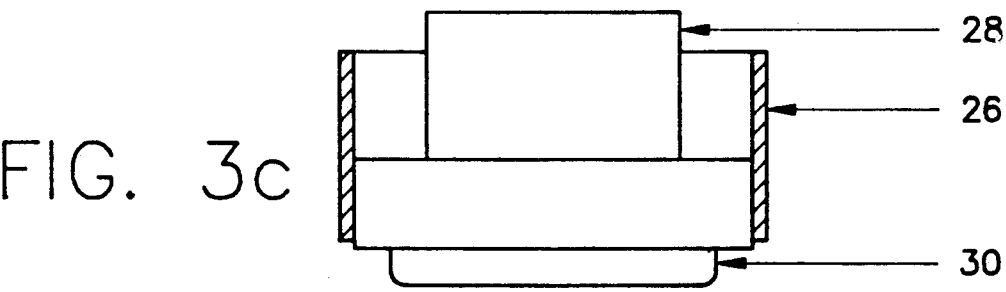
FIG. 3c
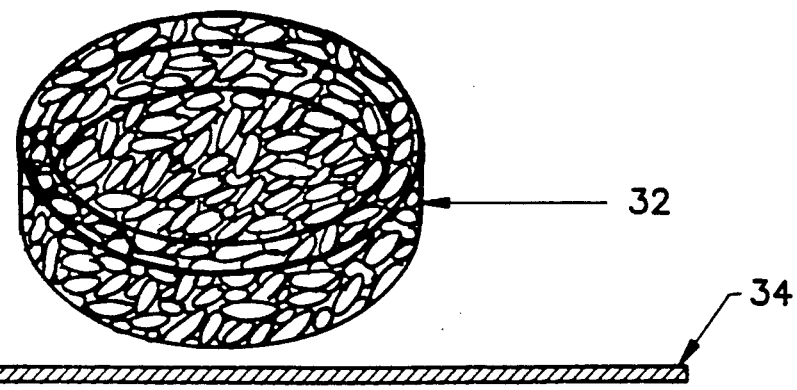

PROCESS FOR PREPARING SHAPED GRAIN PRODUCTS

REFERENCE TO PRIOR ART APPLICATION

This application is a continuation in-part of co-pending application Ser. No. 07/179,658, filed Apr. 11, 1988.

BACKGROUND OF THE INVENTION

Shaped rice products and processes for preparing them have been described in the prior art. For example, in U.S. Pat. No. 3,711,295, a procedure is disclosed for making a shaped rice product having an interior that generally has a homogeneous consistency texture and a relatively hard exterior "crust". In U.S. Pat. No. 3,961,087, a procedure is described for cooking and starch complexing rice in the preparation of shaped rice products.

In U.S. Pat. No. 4,764,390, a process is described for preparing a shaped rice product that is ideal for microwave oven preparation. In that product the rice grains, which may be dispersed together with other grains and food pieces in flavoring amounts, have centers that are not fully cooked and hydrated. These grain centers become fully cooked and fully hydrated when the product is reheated in the microwave oven, which has unique reheating characteristics. A microwave oven can cook the frozen rice grains in the center of the frozen units at the same time that it cooks the product's crust. In fact, the microwave oven reheating technique simultaneously provides sufficient heat and energy to properly fully cook and fully hydrate all the rice grain centers at all the locations in the product.

Although the shaped rice products with not fully cooked grains are ideal for the microwave oven, they are not entirely suitable for other applications. For example, they cannot be prepared in a toaster because the conduction heating pattern provided by toasters causes the centers of the frozen rice grains to become warm but not hot enough for the sufficient length of time required to fully cook and gelatinize the centers of the rice grains before the product's outer surface is burned. Therefore, it is necessary in some cases to control the cooking step of the process such that the grains reach a fully cooked and hydrated state before they are shaped.

Casseroles are usually a combination of food ingredients that are oven-baked in a baking dish. It is typically desirable to make casseroles by combining a variety of different ingredients. For example, casseroles may be made with vegetables, pasta, rice and other grains. However, these casseroles are usually served spooned out of the baking dish, and then eaten with a fork. It would be useful if a grain product were available which offered the variety and appeal of a casserole, yet was in the form of a free-standing unit which can be picked up and hand-held while being consumed.

BRIEF SUMMARY OF THE INVENTION

The present invention provides a process for making shaped cereal grain products that have an interior comprised of a variety of identifiable grains and/or pieces of grains joined together and a thin hard crust surrounding the entire surface of the unit which allows it to be a free-standing unit that can be hand-held while being consumed. Although the products may take any useful shape, preferred products are "carriers" having a cup-like cavity that can later be topped or filled with food, or are casseroles or breakfast foods in the shape of bars or discs.

In accordance with one aspect of this invention, a plurality of cereal grains and/or pieces of cereal grains (hereinafter sometimes collectively referred to as "grains"), which may have substantially different cooking characteristics may be cooked in water and/or steam so that the grains reach the desired fully cooked state at approximately the same time. Then the cooked cereal grains are cooled to a temperature lower than about 170° F., formed into the desired shape under conditions which do not destroy the identity of the individual grains, and heated to form a crust on the surface of the shaped grain product. In a preferred embodiment of the invention, (i) each grain or piece of grain is selected or modified so that it has a predetermined cooking time under the cooking conditions used in the process, and then (ii) the selected or modified grains are added to the cooking water and/or steam, in a sequence and at times dictated by their respective cooking times so that at the completion of the cooking step all of the grains have been cooked for the time sufficient to achieve the same desired fully cooked state. For example, grains requiring longer times to reach the fully cooked state are added first, grains requiring shorter cooking times are added later and grains having the same cooking times are added at the same time, so that all of the grains become fully cooked at the same time at the completion of the cooking step.

It is an object of the present invention to provide a process for preparing breakfast bars, casseroles, carriers and other shaped grain products having a hard surface crust and an interior comprised of identifiable, fully-cooked but firm whole cereal grains or parts of cereal grains joined together, as well as other optional identifiable food pieces dispersed therein.

Another object of the present invention is to provide a process for preparing the aforementioned shaped grain products from cereal grains and pieces of cereal grains that have (i) substantially different cooking times under the same cooking conditions, and/or (ii) substantially the same cooking times under the same cooking conditions.

It is another object of the present invention to provide a process for preparing cereal grain products with a wide variety of other shapes and uses such as, for example, multi-layer shaped casserole products having different grains, colors and/or flavors in each layer; granola-type bar products that can be heated in a microwave or toaster oven and served hot, nugget-shaped products that contain chunks of food dispersed together with identifiable, fully cooked cereal grains; etc.

BRIEF DESCRIPTION OF THE DRAWINGS

FIG. 1A illustrates an example of a shaped cereal grain carrier product made in accordance with the present invention comprising a circular shape and cavity in the top surface in which toppings may be deposited.

FIG. 1B illustrates a cross-sectional view of the carrier product of FIG. 1a, showing a surface crust and an interior of identifiable cooked grains joined together.

FIG. 2 is an illustration of another shaped grain product in the form of a rectangular shaped granola-type bar product made in accordance with the present invention, depicting the appearance of different cereal grains and food chunks in the texture.

FIGS. 3A, 3B, and 3C illustrate steps for forming the grain products into one desired shape.

DETAILED DESCRIPTION OF THE PREFERRED EMBODIMENT

Figure 4:
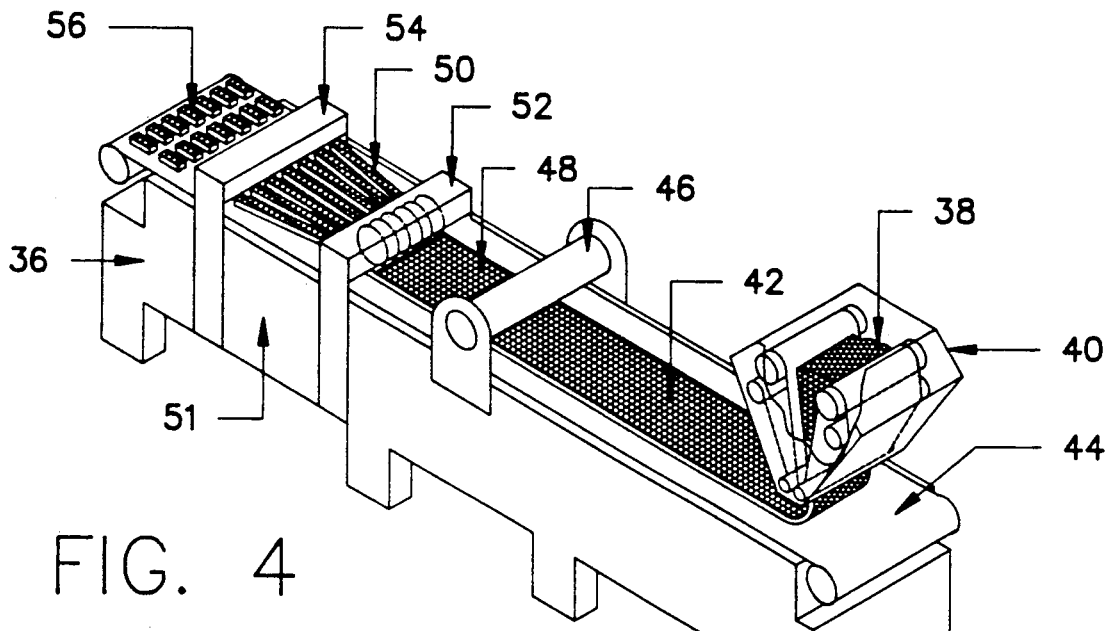
FIG. 4 illustrates an apparatus for forming and cutting a sheet comprised of cereal grains into another desired shape.

Cereal grains typically have different cooking times because they are different grain genera or are different forms of the same grain genera. For example, whole grain wheat, rice and oats have different cooking times because they have different morphology. Grains that have been modified by being de-hulled, broken, cut, rolled, flaked, toasted, par-boiled, etc. (hereinafter such grains are sometimes collectively referred to as "modified grains") have cooking times different from their whole-grain counterparts and other modified grains because they have different physical structures.

The following grain genera have been found to be particularly useful in the practice of this invention, singularly or in a blend, as whole grains, and/or as modified grains: white rice, brown rice, wild rice, wheat, soy, millet, corn, oats, barley, rye, buckwheat, and sorghum. The grains or modified grains should be large enough in size so that the finished product has an appearance and texture of cooked identifiable cereal grains joined together.

Each individual whole and modified cereal grain has a predetermined cooking time, for example as set forth in Table I:

TABLE I

A Partial List of Cereal Grains and Their Cooking Times

| Cereal Grains | Approximate Cooking Time (Mins at 200° F.) |
| --- | --- |
| Long Grain White Rice | 30 |
| Long Grain White Rice (heated w/ fluidized air for 60 secs) | 12 |
| Long Grain Brown Rice | 60 |
| Brown Rice (heated w/ fluidized air for 60 secs) | 30 |
| Whole Grain Oats | 90 |
| Steelcut Oats (8 mesh sized particles) | 50 |
| Steelcut Oats (12 mesh sized particles) | 30 |
| Oat Flakes (0.06" thickness) | 38 |
| Oat Flakes (0.04 thickness) | 30 |
| Whole Grain Wheat | 90 |
| Steelcut Wheat (8 mesh sized particles) | 50 |
| Steelcut Wheat (12 mesh sized particles) | 30 |
| Wheat Flakes (0.04" thickness) | 30 |
| Wheat Flakes (0.06" thickness) | 38 |
| Pearled Barley (0.06" thick flakes) | 30 |
| Rye Flakes (0.04" thickness) | 30 |

Preferably, the selected cereal grains contain gums and/or starches that are available to leach out into the cooking water and, when the cooking water is absorbed by the grains during cooking, form a sticky surfaces on the grains which aid in holding them together during the shaping step.

The grains are selected to achieve a certain predetermined cooking time under the cooking conditions required in the process. For example, the grains are selected using the cooking times set forth in Table I above, and then the selected grains are added to the cooking water and/or steam in a sequence and at time intervals determined by the relative cooking times of the selected grains, so that at the completion of the cooking step all of the added grains have been cooked for a time sufficient to achieve the same desired fully cooked state. The term "fully cooked" is used herein, including the claims, to designate a cooked state in which substantially all of the starch granules of the grains are completely gelatinized but not swollen and ruptured, so that the centers of the grains are soft but the grains remain intact and retain their individual identities.

In accordance with one aspect of this invention, it can be seen that if one or more of the grains that one has available to use in the shaped grain product has a cooking time which is undesirable for one reason or another, e.g., a whole grain which requires an inordinately long cooking time, the grain may be modified to make its cooking time more acceptable. For example, the cooking times of the grains may be altered by breaking or cutting the grains into smaller pieces as is done to produce "steel cut oats" or by flattening the grains with rollers such as is done to produce cereal "flakes", or by partially pre-cooking the grains before performing the cooking step, such as by "toasting" or heating the grains with hot (about 400° F.) fluidized air for a short time (30 to 60 seconds) or "par-boiling" or pre-cooking the grain such as done with par-boiled rice. As stated previously, the term "modified grain" used herein, including the claims, is intended to include all of the above methods of grain modification and all other suitable methods known to the art.

It is within the scope of the present invention to make the shaped grain product using a mixture of different forms and sizes of the same cereal grain genera, such as, for example, a mixture of whole grain oats, 8 mesh sized pieces of steel cut oats and 0.04" thick rolled (flattened) whole grain oats. Since it can be seen from Table I that each of these three oat forms requires a different cooking time, a mixture of these grains may be cooked by a sequencing technique in accordance with the present invention. The whole grain oats requiring a 90 minute cooking time are added first to the cooking water; then, the 8 mesh pieces of steel cut oats requiring a 50 minute cooking time are added 40 minutes later; finally, the 0.04" thick rolled oats requiring a 30 minute cooking time are added 20 minutes after the steel cut oats. By adding the grains in this manner, all of the grains become fully cooked in approximately 90 minutes.

It should be noted that even when shaped grain products are made solely from one modified form of a single cereal genus, the modified grain particles or flakes should be screened or sorted by size before they are used in accordance with this invention. When grains such as oats are modified by conventional processes, such as by steel cutting or flaking, each setting of the steel cutters or flaking rolls (for example, the setting used to produce a 0.04" thickness) produces a distribution of particles with different sizes, shapes and thicknesses (within a given range around the 0.04" thickness), each of which require a slightly different cooking time. For example, the larger sized oat particles require longer cooking times than the smaller oat particles and thicker oat flakes require longer cooking times than thinner oat flakes. After the modification process, the oat particles or flakes may even also include very small sized and intact whole grain oats that moved through the cutters or flaking rolls, but were not modified because of their small size. These intact, small whole grains have to be separated and removed because they require a much longer cooking time than the modified oat particles or flakes. The remaining mixture of different sized oat flakes or particles may then be screened into particles or flakes that have similar size and a similar cooking time and these similarly sized particles or flakes may be added to the cooker at the same time at a time dictated by that cooking time.

Cereal grains of different grain genera may also be modified so that they can be cooked in accordance with this invention by adding them all to the cooker at the same time. Since the different grains in their natural (whole grain) state usually require different cooking times, these whole grains may be modified to make their cooking times substantially the same. For example, if oats are flattened to about 0.04" thickness and pearled barley is flattened to about 0.06" thickness, their cooking times are reduced to about the same as long grain white rice (30 minutes), and therefore these modified grains and the rice can be added to the cooking water at the same time and all become fully cooked at about the same time, i.e. in about 30 minutes. In another variation, the whole grain oats may be partially cooked separately to a point where the remaining cooking time equals the cooking time of the long grain white rice. Having changed the cooking times of the grains to equal each other as the result of these modifications, the grains may now be added to the cooker at the same time and become fully cooked at the same time.

Figure 6:
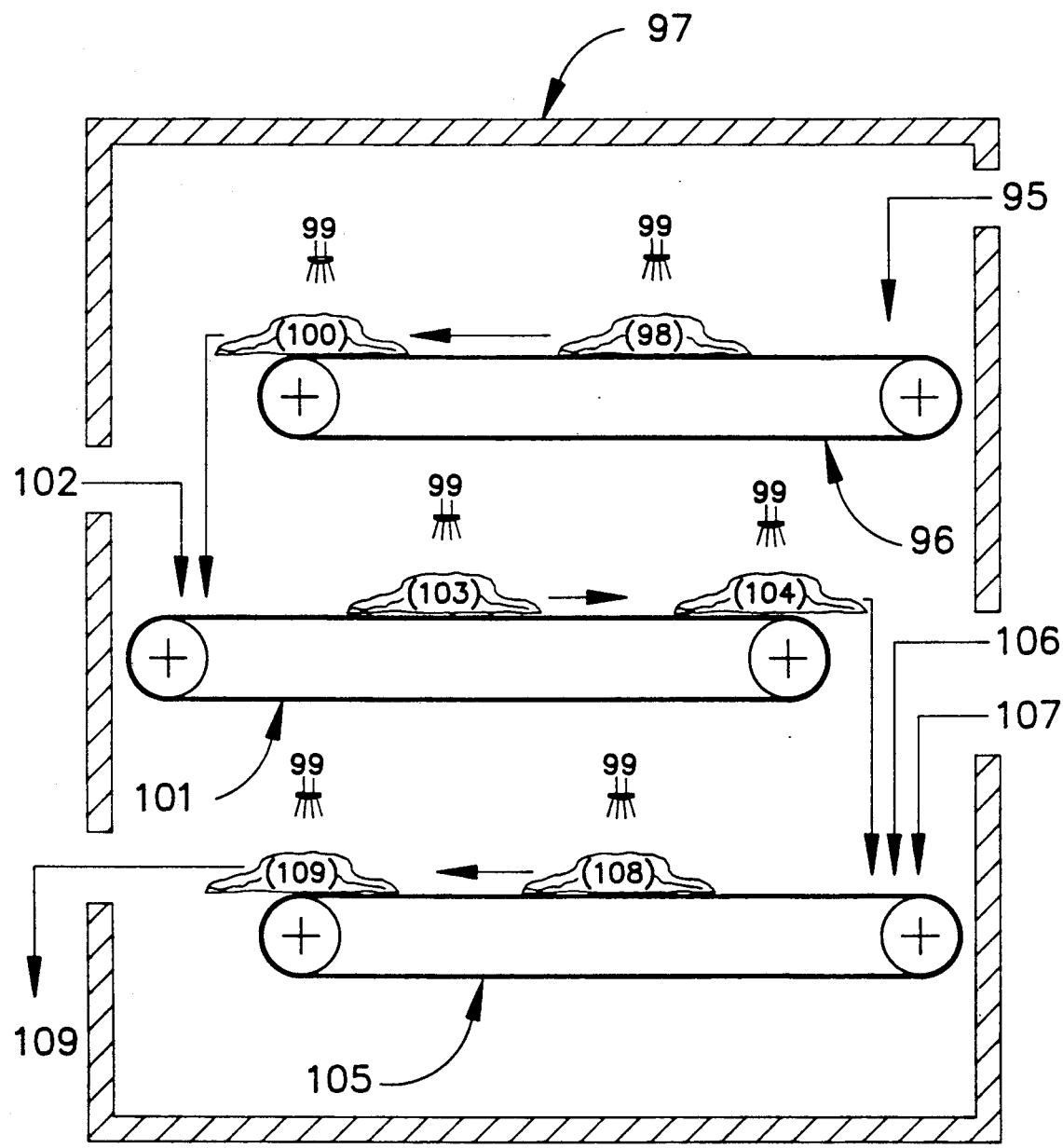
FIG. 6 illustrates a method of continuously cooking four grains in accordance with one aspect of the invention.

One example of a continuous cooker which is suitable for cooking four different grain genera in accordance with this invention is illustrated in FIG. 6. This cooker comprises three belts, each having an adjustable belt speed. Four cereal grains with different cooking times are selected, i.e. steelcut oats (8 mesh sized particles—cooking time: 50 minutes), wheat flakes (0.06" thickness—cooking time: 38 minutes), rye flakes (0.04" thickness—cooking time: 30 minutes) and long grain white rice (cooking time: 30 minutes) and these grains are cooked together in the continuous cooker in the following manner:

First, the steel cut oats (95) are metered onto the belt conveyor (96) within the cooker (97). Then, the deposited oats (98) are cooked with a controlled amount of a 205° F. dispersion (99) of water and a monoglyceride/vegetable oil blend for 12 minutes. The partially cooked oats (100) are then deposited on the second conveyor (101). The dry wheat flakes (102) are metered onto the second conveyor (101) and blended together with the partially cooked oats (100). The oats and wheat mixture (103) are cooked together for 8 minutes with a controlled amount of the 205° F. water/monoglyceride/vegetable oil dispersion (99). The partially cooked oats and wheat (104) are then deposited on the third conveyor (105). The dry rye flakes (106) and long grain white rice (107) are both metered onto the third conveyor (105) at the same time and are then blended together with the partially cooked oats and wheat (104). All four grains (108) are then cooked together for 30 minutes with a controlled amount of the water/monoglyceride/vegetable oil dispersion (99). Finally, the fully cooked mixture of oats, wheat, rice and rye (109) are discharged from the cooker (97) at the same time.

As indicated, starch complexing agents, such as monoglycerides, may be included in the water used to cook the grains. A pre-blend of monoglycerides and vegetable oil, with monoglycerides preferably comprising less than 85% of the blend, is particularly useful because dry, powdered monoglycerides are not stable in boiling water. They immediately change chemically and irreversibly into a gel-like material which does not react with the amylose in the grains and therefore does not complex the starch. Other starch complexing agents that can be used include: acetylated monoglyceride, glyceryl monostearate, glyceryl monopalmitate, glycerol monolaurate, glyceryl monomyristate, glyceryl monoarachidate, glyceryl monooleate, glyceryl monolinoleae, calcium stearoyl-2-lactylate, sodium, stearoyl-fumarate sucrose fatty acids, and succinylated monoglycerides.

The fully cooked grains may be used alone or in combination with other food ingredients, such as pasta, vegetables, fruits, meats, poultry, nuts, fish, etc., as more fully described hereinafter. These additional food ingredients may take a variety of shapes and sizes, for example, the pasta may be in the form of vermicelli, rods, noodle-shaped pasta pieces, pasta pieces shaped like rice grains, macaroni shaped rice pieces, etc.

The grains are preferably cooked in hot water and/or low pressure steam at a temperature of about 180° F.-212° F. until fully cooked. The cereal grains are preferably cooked and gently blended until just about all the water (and complexing agent, if used) is absorbed into the grains. The water and/or steam is used in an amount which is controlled so that, after the absorption of the water by the grain and the evaporation of water during the cooking step, there is no excess of water remaining after the grains become fully cooked. The amount of water used is preferably equal to from about two to four times the dry weight of the grains in the mixture.

When several cereal genera are cooked together in a batch or continuous cooker and monoglycerides are used, the monoglyceride/vegetable oil blend is added to the cooker together with the cereal grains in a ratio of about 1 lb monglycerides/100 lbs of dry cereal grains. If all the grains are added at the same time, all the monoglycerides are added at one time. However, if the grains are added in a sequence and at different times, it is desirable to add the appropriate amount of monoglyceride/vegetable oil blend at different times and maintain the 1 lb monoglyceride/100 lbs dry cereal ratio.

The cooking time used for the mixture is sufficient for substantially all of the grains to be fully cooked. The cooking of the grain mixture is not allowed to proceed to the point where the grains are "overcooked", i.e. where substantial amounts of the starch cells of the grains are ruptured and overhydrated, thereby giving the mixture a "mushy" homogeneous consistency in which the individual identities of the grains are lost.

When the centers of the grains become fully cooked in accordance with this invention, other ingredients such as various types of flavoring ingredients, may be added to the mixture. As examples of flavoring ingredients that are suitable for addition to the grain mixture as described above, mention may be made of the following;

1. Herb, Spice and other Flavoring Ingredients: This category consists of soluble and dispersible ingredients such as salt, butter, cheese, monosodium glutamate, soy sauce, honey, herbs, spices, and other natural and artificial food flavoring ingredients. These ingredients may be coated with oil or butter, or dispersed or dissolved in water before being added to the cooked grains.

2. Natural Food Pieces: Natural food pieces such as mushrooms, shrimp, vegetables, fruits, nuts, sesame seeds, onions, apples, raisins, and diced poultry or ham can be dispersed together with the soft fully cooked cereal grains.

3. Cooked Pasta Pieces: The pasta pieces may be in different shapes, such as vermicelli rods, noodles, ovals, spheres, etc., and dispersed directly with the cooked grains.

The dry powdered flavoring ingredients and the food pieces are preferably added at the same time at the end of the grain cooking step. The dry ingredients may be added either as a solution or coated with oil or butter and sprinkled directly onto the grains as they are gently mixed. Powdered ingredients are preferably precoated with oil to prevent "clumping".

Reducing sugars, such as dextrose, and sodium acid pyrophosphate, may also be added to help control the golden brown surface color of the shaped grain products. Sodium acid pyrophosphate not only improves the product's texture, but also chelates the heavy metals and prevents the product's surface color from becoming excessively dark. Some dextrose or other reducing sugar may be used to help develop the products' surface color when the crust is later formed.

After the cooking step and any desired flavoring of the grains as described above, the grains are cooled. The object of this cooling step is to allow the water to hydrate into the grain "centers" yet prevent the grain surfaces from overcooking. During the cooling step, the grains also become more firm in texture to better withstand the subsequent shaping operation. The grains are cooled using cold water or air to quickly reduce their temperature to lower than about 180° F., preferably lower than about 150° F. but higher than the freezing temperature. If the hot grains were not cooled, they would remain at about 180° F.-212° F. for some time, even if they were discharged from the cooker. These grains will continue to cook at this temperature and eventually the surface of the grains becomes overcooked and pasty and unacceptable for use in the present invention.

The starches and/or gums in the preferred cereal grains leach into the cooking water during the above-described cooking step. Since the grains absorb substantially all of the water during the cooking step, after the cooling step, these leached-out starches and/or gums remain on the grain surfaces and make them sticky. When the cooked grains are formed into units of the desired shape, they are preferably held together solely by their sticky surfaces. However, in other embodiments (for example, when whole grains and/or large particles of modified grains that release insufficient amounts of starch and gums into the cooking water are the only grains in the mixture), additional gums and/or starches that form a gel, such as carboxy methyl cellulose, may be included in the mixture to aid in binding the grains together. Also CMC binders that form gels are sometimes added to further strengthen the structure of carrier products that are later filled with food.

The following three shaping or forming techniques are particularly useful for producing the product's shape while retaining the appearance of individual grains in the finished product:

1. Carriers 16 (as illustrated in FIG. 1A), which may be casseroles with cup-like cavities 18 that could be later filled with food, can be formed into shapes like circles, ovals, rectangles, etc. FIGS. 3A, 3B and 3C illustrate how the cooked grains are formed into cup like units by pressing the grains with a die and a mold wherein the die forms the units' cavity and the mold forms the units' shape. With different dies, this forming technique can also be used to form circular, oval, triangular and other shaped units that do not have cup-like cavities.

2. Different sized and shaped nuggets, sticks and bars (like the rectangular shaped granola type bar product 20 illustrated in FIG. 2) are formed into shapes by cutting a sheet of grains with the well-known and readily-available forming equipment illustrated in FIG. 4.

3. Different sized and shaped nuggets, sticks and bars (like the rectangular shaped granola type bar product 20 comprised of cooked grains 22 and food pieces 23) can also be formed with Double Roll Formers (well known in the art and readily available in the market) that have large diameter rolls and Teflon coated die holes.

These three shaping techniques are now discussed in more detail. FIGS. 3A, 3B, and 3C illustrate the steps of one of the techniques used to produce a carrier shaped product 16.

In the first step illustrated in FIG. 3A, the cooled, fully cooked grains 24, are volumetrically measured and then deposited into the mold 26 while the piston 28 moves a die plate 30 in the "up" position. In the second step illustrated in FIG. the cross sectional view in 3B, the piston 28 moves the die plate 30 down into the mold 26 and presses and reshapes the fully cooked grains 24 into the selected shape such as a circular carrier shape 32. Finally, in the third step illustrated in the cross sectional view in FIG. 3C, the mold 26 is moved up and the formed shape 32 separates from the die plate 30 and deposits onto the belt conveyor 34. When carriers are formed compressed air or other means may have to be provided to separate the carrier shapes 32 from the die plate 30. The object is to form the units with a minimum amount of shear so the deposited units retain the grain and cavity shaped appearance as illustrated in FIG. 3C.

One means of forming rectangular shaped units, as illustrated in FIG. 2 that have the appearance of cooked cereal grains or parts of cereal grains is to use a forming device well known in the art and readily available that incorporates large diameter, double roll formers to push cooled, fully cooked grains through a die with die holes. The rolls should have at least a 4 inch diameter. Larger diameter rolls are even better because they reduce the churning between the two rolls; and the die holes should be coated with Teflon or other material that reduces friction.

Another way to make shapes from fully cooked and cooled grains is by forming a sheet of grains and then cutting the sheet into the desired shape. A forming device 36 for making rectangular shapes by this technique is illustrated in FIG. 4. In the first step, the grains that have been previously fully cooked and cooled 38 are compressed between a double-roll former (not illustrated), multiple compression rolls (not illustrated) or two converging conveyors 40 and leave the converging conveyors 40 as a sheet 42 which still retains the appearance of the cooked grains. The sheet 42 which is conveyed on a belt conveyor 44 is then reduced to the proper thickness with a compression roll 46. The sheet with the desired thickness 48 is first cut into strips 50 with rotary cutters 52. The strips 50 are separated with a spreader 51. Then the strips 50 are cut into the desired lengths with a guillotine cutter 54 resulting in a rectangular shaped product 56. Both cutting devices are well known in the art and readily available in the market.

Figure 5:
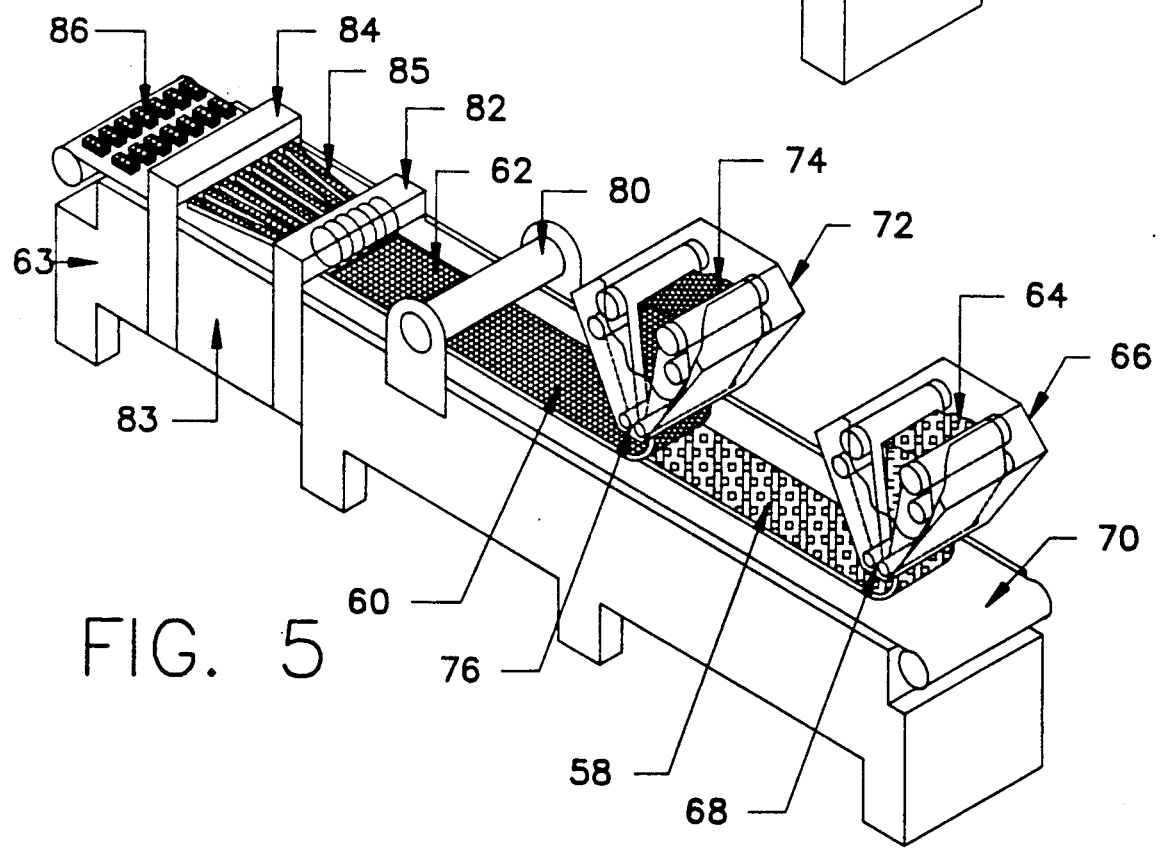
FIG. 5 illustrates a forming apparatus for forming casserole shapes that have multiple cooked grain layers.

A shaped grain casserole product that has a surface crust and a center that has two layers with different grains or colors and flavors in each layer, can also be made by the technique illustrated in FIG. 5, providing the grains are fully cooked, hydrated, and gelatinized so they can be quickly reheated from the frozen state even with a toaster or toaster oven.

The shape is formed after a second sheet of cooked and cooled grains 60 is layered on top of a first sheet of cooked and cooled grains 58. The combination of the first and second sheets 62, can be cut into different shapes.

FIG. 5 illustrates a forming device 63 that illustrates how rectangular shapes are cut from the sheets. Cooked and cooled grains 64 are compressed into the first grain sheet 58 either with a double roll former (not illustrated), multiple compression rolls (not illustrated) or with the first converging vertical belt conveyor 66. The gap between the belts 68 is adjustable so the sheet thickness at the exit can be controlled. The first sheet 58 is deposited onto the horizontal belt conveyor 70 that moves the sheet to the second converging vertical belt conveyor 72. Cooked and cooled grains 74 are compressed into the second grain sheet 60 either with a double roll former (not illustrated), multiple compression rolls (not illustrated) or with the second converging vertical belt conveyor 72. The gap between the belts 76 is adjustable so the sheet thickness at the exit can be controlled. The second grain sheet 60 is layered on top of the first sheet 58 and both are moved on the horizontal belt conveyor 70 to the compression roll 80 that compresses both layers into one layer 62. The rotary cutters 82 cut the two layered sheet 62 into strips 85 which are then separated with a spreader 83 and finally cut into the desired sized units 86 with a guillotine cutter 84.

When the dual textured casseroles are made, one of the cooked grain layers may be made with a less expensive flavor blend while the other cooked grain layer may be made with more expensive food pieces and thereby provide casseroles with a more desirable and rich taste and appearance.

Once the shapes are made, they are heated until a crust forms on their surface. FIG. 1A illustrates a grain carrier, which is a casserole with a cup-like cavity that could be later filled with food before a crust was formed. FIG. 1B illustrates the same grain carrier after a crust 88 was formed on its surface. The carrier 90 is cut in half to better illustrate the surface crust 88, the cup-like cavity 92 and the fully cooked grains 94 in the product's interior.

The crust may be formed by heating the shaped grain product using conventional methods such as baking or frying. This heating step accomplishes two objectives: a) it develops a crust on the surface of the units which hold the cereal grains in the desired shape, and b) it assures that any small amounts of ungelatinized starch which may be remaining in the centers of the grains becomes fully gelatinized before the units are frozen. Fully cooked, hydrated and gelatinized grains are important, especially for units that are suitable for preparation in a reheating appliance such as a toaster.

When the crust is formed on the surface by frying the shaped units in hot fat or fat substitute, the units are fried at about 400° F. until the crust and a golden brown surface color forms and all grain centers become fully gelatinized. The units absorb the fat or fat substitute during frying and have to be drained or defatted. The units that have a large surface area, such as the circular shaped units illustrated in FIGS. 1A and 1B, are very difficult to defat because the hot fat on the top of the units or inside the units cavities won't drain properly unless the units are placed on their ends during the defatting operation. Blown hot air and vibration can help facilitate the removal of most of the excess fat from the unit's surfaces.

When baking is employed to form the crust, the shaped products are preferably exposed to a temperature of from about 275° F. to about 500° F. in an oven. It is sometimes desirable to produce oven baked units that have surface colors and grain textures that are similar to units that were fat fried. This may be achieved with flavors that impart a "greasy" taste and/or with a surface pretreatment step which comprises a spray coating of a water or oil solution that contains food color or reducing agents that will brown during the oven baking operation to create a golden brown color on the unit's surface.

In a preferred embodiment, the shaped grain products are rapidly frozen. Freezing can be done with either cold air, liquid nitrogen, or liquid carbon dioxide. It is desirable to freeze the units to about 0° F. The freezing process and freezers suitable for this task are well-known in the art and are commercially available.

After freezing, the frozen shaped grain products may be subsequently packaged and stored frozen. When the shaped grain products are later thawed by the consumer, their surface crusts become about as soft as their centers. If the product is reheated on a steam table, the surface crust will continue to remain about as soft as its center. However, if the unit is reheated with a hot air oven, microwave oven, or fryer, the surface crust will change and become more firm or crisp. These fully cooked and gelatinized products can even be reheated from the frozen state with a pop-up toaster or toaster oven.

The following examples will further illustrate the invention, but it is not intended that the invention be limited to the details set forth therein:

EXAMPLE 1

Oven Baked Breakfast Bar

This example describes the preparation of a bar shaped nutritious breakfast food of the type illustrated in FIG. 2. This product may ba heated in a toaster or microwave oven because its cereal components are not held together with a heavy syrup binder which can melt in the oven, causing the bar to completely lose its structure and fall apart.

The oven baked breakfast bars of this example were made from a blend of six cereal grains which have been modified so as to have substantially the same cooking times under the same cooking conditions in accordance with this invention.

The ingredients used to prepare the products were:

| Ingredients | Percent |
| --- | --- |
| Water | 73.0 |
| Spices and Herbs | 0.5 |
| Sugar | 4.7 |
| Natural Fruit Flavors | 0.3 |
| Dextrose | 0.4 |
| Vegetable Oil | 1.5 |
| Distilled Monoglycerides | 0.25 |
| Sodium Acid Pyrophosphate | 0.05 |
| Barley, Pearled (0.06" thick flakes) | 1.1 |

-continued

| Ingredients | Percent |
| --- | --- |
| Oats (12 mesh particles) | 5.4 |
| Wheat (0.04" thick flakes) | 5.4 |
| Brown Rice, Long Grain (toasted 400° F. for 1 min. | 3.2 |
| Rye (0.04" thick flakes) | 1.1 |
| White Rice, Broken Grain | 3.1 |
| Total | 100.0 |

The grain modification and cooking were accomplished in the following manner. The whole grain oats which requires a 90 minute cook time were steelcut into 12 mesh sized particles. This modification changed their cooking time to about 30 minutes. The whole grain wheat and rye grains which require a 90 minute cook time were flattened to a 0.04" thick flake with cereal flaking rolls. This modification changed their cooking times to about 30 minutes. Long grain brown rice, which requires a 55 minute cook time was heated with 400° F. fluidized air for one minute. This modification changed its cooking time to about 30 minutes. Pearled barley, which requires a 45-50 minute cook time, was flattened to a 0.06" thickness with cereal flaking rolls. This modification changed its cooking time to about 30 minutes. Broken grain white rice has a 30 minute cooking time. All six cereal grains were added to the cooker together at the same time and the mixture was corked for 30 minutes in 205° F. water containing a dispersion of monoglyceride/vegetable oil blend. The six grains in the mixture all reached the desired fully cooked state at the same time and were all discharged from the cooker at the same time.

The cereal grains were removed from the cooker when their centers were soft and the grains were still firm, not overcooked. The 200° F. hot cooked grains were dispersed together with an unheated flavoring mixture containing the CMC gum and other dry ingredients. The grains were then formed into bars with the forming device illustrated in FIG. 5. This forming device produced breakfast bars with textures comprised of identifiable grains as illustrated in FIG. 2, not as a homogeneous consistency textured cereal.

The bars were then ovenbaked at about 325° F.-380° F. This ovenbaking developed a self crust with a golden brown color without burning the surfaces of the breakfast bar. Finally, the bars were frozen.

EXAMPLE 2

Cereal Bars Made From Steelcut Oats

A cereal bar was made in accordance with the process described in Example 1, except that steelcut oats were the only grains used. The steelcut oats were separated by particle size and the larger sized particles were added to the cooker first and cooked longer than the smaller sized particles. This procedure allowed all the particles to reach the fully cooked state at the same time.

EXAMPLE 3

Hand-Held Grain Carriers

This example describes the preparation of a food carrier of the type illustrated in FIG. 1 that has a cavity that can be filled or topped with food chunks and/or sauces and hand-held while being consumed. Whereas traditional carriers have a homogeneous consistency texture like bread rolls, this carrier has a texture that is comprised of identifiable, fully cooked cereal grains in accordance with this invention.

The ingredients used to prepare the products were:

| Ingredients | Percent |
| --- | --- |
| Water | 67.7 |
| Steelcut Oats (8 mesh sized particles) | 5.3 |
| Wheat Flakes (0.06" thickness) | 5.3 |
| Long Grain White Rice | 5.3 |
| Apple Flakes, dried | 3.3 |
| Raisins | 3.0 |
| Spices and Herbs | 0.4 |
| CMC (Methocel) Binder | 0.5 |
| Sugar | 2.5 |
| Dextrose | 2.0 |
| Vegetable Oil | 2.1 |
| Distilled Monoglycerides | 0.2 |
| Natural Flavors | 0.6 |
| Non-Fat Dry Milk | 1.8 |
| Total | 100.0 |

The grain modification and cooking were accomplished in the following manner. The whole grain oats, which require a 90 minute cook time, were steelcut into particles and screened to size. This modification changed their cooking time to 50 minutes. The whole grain wheat, which requires a 90 minute cook time, was flattened to a 0.06 thick flake with cereal flaking rolls. This modification changed its cooking time to 38 minutes. The modified oats were added to the cooker first and cooked for 12 minutes in 205° F. water containing a dispersion of monoglyceride/vegetable oil blend before the wheat flakes were added to the mixture. Then, both the modified oats and wheat were cooked together for an additional 8 minutes before the rice was added to the mixture. The three grains in the mixture were cooked together and all three reached the desired fully cooked state at the same time, 30 minutes after the rice was added.

The cereal grains were removed from the cooker and dispersed together with the remaining ingredients, and the grains were cooled to about 170° F. After the flavors were fully absorbed into the cooked grains, the mixture was formed into the carrier shapes illustrated in FIG. 1 with the forming system illustrated in FIGS. 3A, 3B and 3C.

The shaped carriers were fat fried at about 400° F. Alternatively, the units were oven baked in a (hot air) convection oven. Both heating techniques developed textures in which identifiable grains were retained on the units' surfaces and within the units' interiors and, in addition, were structurally strong enough to hold food in their cavities and be consumed while being hand-held.

It is understood that the above described process and the above examples are simply illustrative of the application of principles of the invention and many other modifications may be made without departing from the spirit and scope of the invention.

The embodiments of the invention in which an exclusive property or privilege is claimed are defined as follows:

We claim:

1. A process for making a shaped cereal grain product that has a surface crust and an appearance of fully cooked but intact grains joined together, said process comprising the steps of:

(a) selecting or modifying a plurality of cereal grains wherein one or more of the grains have different cooking times under the same cooking conditions so that each cereal grain has a predetermined cooking time under the cooking conditions used in the process;

(b) cooking said grains in hot water and/or steam until the grains are fully cooked and have developed sticky surfaces as a result of re-absorbing the cereal starches and/or gums which had leached out into the cooking water; said grains having been added to the cooking water and/or steam in a sequence and at times dictated by their respective cooking times so that all of said grains become fully cooked at approximately the same time at the completion of the cooking step;

(c) cooling the cooked cereal grains to a temperature lower than about 180° F. in a manner such that the grain surfaces remain sticky;

(d) forming the fully cooked and cooled cereal grains into a shaped unit while retaining the identity of individual cereal grains; and (e) heating the surface of the shaped cereal grain unit until a thin skin-like crust develops on the unit's surface which helps retain the unit's shape.

2. The process of claim 1 wherein the cereal grains are of different genera and are modified so as to have substantially the same cooking times and are added to the cooking water and/or steam at the same time.

3. The process of claim 1 wherein the grains requiring the longest cooking time are added to the cooking water/steam first, grains requiring shorter cooking times are added later, grains requiring the shortest cooking time are added last and grains having the same cooking times are added at the same time.

4. The process of claim 1 wherein the cereal grains are selected from the group consisting of white rice, brown rice, wild rice, wheat, millet, corn, oats, barley, rye, buckwheat, sorghum, and combinations thereof.

5. The process of claim 1 wherein the cereal grains are selected from the group consisting of whole grains of the same genera, modified grains of the same genera, whole grains of different genera, modified grains of different genera, and combinations thereof.

6. The process of claim 1 wherein whole grains of the same genera are modified by cutting with a steel cutter and separating the cut grains by size, each cut grain size having a predetermined cooking time.

7. The process of claim 1 wherein grains are modified by flattening with cereal flaking rolls and separating the flakes by size, each flake size having a predetermined cooking time.

8. The process of claim 1 wherein grains are modified by heating, each heated grain having a predetermined cooking time.

9. The process of claim 8 wherein grains are heated with about 400° F. fluidized air for about 30 to 60 seconds.

10. The process of claim 8 wherein grains are partially pre-cooked in hot water prior to the cooking step so that during the cooling step the grains become fully cooked after said predetermined time.

11. The process of claim 1 wherein the unit is shaped to have a cup-like cavity adapted to be filled with food and the unit is consumed while being hand-held.

12. The process of claim 1, wherein the unit is shaped into a sheet, strip, nugget, bar, stick, or bowl.

13. The process of claim 1 wherein the grains are cooked at a temperature of from 180° F. to 212° F.

14. The process of claim 1 which further comprises the step of freezing the shaped cereal grain unit.

15. The process of claim 1 which further comprises adding to the cereal grains other ingredients selected from the group consisting of flavoring ingredients, herbs, spices, natural food pieces, pasta pieces, reducing sugars, sodium acid pyrophosphate, binders, starch complexing agents, and combinations thereof.

16. The process of claim 15 wherein said starch complexing agent is a blend of monoglycerides and vegetable oil, with monoglycerides comprising less than 85% of the blend.

17. The process of claim 1 wherein said crust is formed by frying or baking the shaped cereal grain unit.

18. The process of claim 1 wherein the amount of water absorbed by the grains is from 2 to 4 times the dry weight of said grains.

19. The process of claim 1 wherein the cooked grains are shaped into units by pressing the grains into the shape with a die and a mold wherein the shape of the mold forms the units' shape.

20. The process of claim 1 wherein the cooked grains are shaped into cup-like units by pressing the grains into the shape with a die and a mold, said die forms the units' cavity and said mold forms the units, shape.

21. The process of claim 1 wherein the cooked grains are pressed together into a continuous sheet and said sheet is cut into the desired shape unit.

22. The process of claim 21 wherein one flavored textured sheet of cereal grains is layered on top of a second flavored textured sheet of cereal grains, the two layers are pressed together and cut into the desired shaped unit.

23. The process of claim 1 wherein grains are cooked in separate cookers and the fully-cooked grains are blended together prior to the forming step.

* * * * *